(12) United States Patent
Wong et al.

(10) Patent No.: US 7,711,201 B2
(45) Date of Patent: May 4, 2010

(54) METHOD OF AND APPARATUS FOR GENERATING A DEPTH MAP UTILIZED IN AUTOFOCUSING

(75) Inventors: Earl Q. Wong, San Jose, CA (US); Makibi Nakamura, Tokyo (JP); Hidenori Kushida, Tokyo (JP); Soroj Triteyaprasert, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 986 days.

(21) Appl. No.: 11/473,694

(22) Filed: Jun. 22, 2006

(65) Prior Publication Data

US 2007/0297784 A1  Dec. 27, 2007

(51) Int. Cl.
*G06F 9/40* (2006.01)
(52) U.S. Cl. ........................ 382/254; 382/255
(58) Field of Classification Search ............... 382/254, 382/255
See application file for complete search history.

(56) References Cited

U.S. PATENT DOCUMENTS

| | | | |
|---|---|---|---|
| 4,349,254 A | 9/1982 | Jyojiki et al. ............ 354/25 |
| 4,751,570 A | 6/1988 | Robinson .................. 358/88 |
| 4,947,347 A | 8/1990 | Sato ....................... 364/522 |
| 4,965,840 A | 10/1990 | Subbarao ................... 382/1 |
| 5,148,209 A | 9/1992 | Subbarao ................ 354/400 |
| 5,365,597 A | 11/1994 | Holeva .................... 382/8 |
| 5,577,130 A | 11/1996 | Wu ....................... 382/106 |
| 5,604,537 A | 2/1997 | Yamazaki et al. ........ 348/350 |
| 5,703,637 A | 12/1997 | Miyazaki et al. .......... 348/53 |
| 5,752,100 A | 5/1998 | Schrock ................. 386/129 |
| 6,177,952 B1 | 1/2001 | Tabata et al. ............ 348/47 |
| 6,229,913 B1 | 5/2001 | Nayar et al. ............ 382/154 |
| 6,683,652 B1 | 1/2004 | Ohkawara et al. ....... 348/347 |

(Continued)

FOREIGN PATENT DOCUMENTS

JP          10108152         4/1998

(Continued)

OTHER PUBLICATIONS

Earl Wong ("A new Method for Creating a Depth Map for Camera Auto Focus Using an All in Focus Picture and 2D Scale Space Matching" Acoustics, Speech and Signal Processing, 2006. ICASSP 2006 Proceedings. 2006 IEEE International Conference on vol. 3, May 14-19, 2006 p. III-III).*

(Continued)

*Primary Examiner*—Tom Y Lu
(74) *Attorney, Agent, or Firm*—Haverstock & Owens LLP

(57) ABSTRACT

A method of and an apparatus for determining a depth map utilizing a movable lens and an image sensor are described herein. The depth information is acquired by moving the lens a short distance and acquiring multiple images with different blur quantities. An improved method of simulating gaussian blur and an approximation equation that relates a known gaussian blur quantity to a known pillbox quantity are used in conjunction with a non-linear blur difference equation. The blur quantity difference is able to be calculated and then used to determine the depth map. Many applications are possible using the method and system described herein, such as autofocusing, surveillance, robot/computer vision, autonomous vehicle navigation, multi-dimensional imaging and data compression.

30 Claims, 8 Drawing Sheets

U.S. PATENT DOCUMENTS

| | | | |
|---|---|---|---|
| 6,829,383 B1 | 12/2004 | Berestov | 382/154 |
| 6,876,776 B2 | 4/2005 | Recht | 382/255 |
| 6,891,966 B2 | 5/2005 | Chen | 382/145 |
| 6,925,210 B2 | 8/2005 | Herf | 382/264 |
| 7,019,780 B1 | 3/2006 | Takeuchi et al. | 348/340 |
| 7,035,451 B2 | 4/2006 | Harman et al. | 382/154 |
| 2003/0067536 A1 | 4/2003 | Boulanger et al. | 348/14.08 |
| 2003/0231792 A1 | 12/2003 | Zhang et al. | 382/154 |
| 2004/0027450 A1 | 2/2004 | Yoshino | 348/42 |
| 2004/0036763 A1 | 2/2004 | Swift et al. | 348/51 |
| 2005/0104969 A1 | 5/2005 | Schoelkopf et al. | 348/207.99 |
| 2005/0265580 A1 | 12/2005 | Antonucci et al. | 382/103 |
| 2006/0120706 A1 | 6/2006 | Cho et al. | 396/17 |
| 2006/0221179 A1 | 10/2006 | Seo et al. | 348/46 |
| 2006/0285832 A1 | 12/2006 | Huang | 386/117 |
| 2007/0040924 A1 | 2/2007 | Cho et al. | 348/335 |

FOREIGN PATENT DOCUMENTS

| | | |
|---|---|---|
| JP | 2004048644 | 12/2004 |

OTHER PUBLICATIONS

Eugene Hecht, Optics 3$^{rd}$ Edition, Addison-Wesley, The Propagation of Light, Chapter 4, pp. 126 date: Apr. 17, 2006.

Berthold Klaus Paul Horn, "Robot Vision," 1986, pp. 1-509.

Tony Lindeberg, "Scale-Space Theory in Computer Vision," 1994, pp. 1-423.

"Blickgesteuerte PC-Steuerung", Forschung & Entwicklung, XP-000725834, publication date Aug. 4, 1997, pp. 76-78.

21$^{st}$ Century 3D: 3DVX3 Press Release; 21$^{st}$ Century 3D Introduces Uncompressed 4:4:4 Steroscopic camera System—3DVX3; San Jose Convention Center Jan. 18, 2006 SPIE Steroscopic Displays and Applications conference.

Three-dimensional Camera Phone; Smithsonian/NASA ADS Physics Abstract Service; find Similar Abstracts (with default settings below); Electronic Refereed Journal Article (HTML); Full Refereed Journal Article (PDF/Postcript); Reads History; Translate Abstract; Title: Three-dimensional Camera Phone, Authors: Iizuka, Keigo, Publications: Applied Optics IP, vol. 43, pp. 6285-6292, Publication Date: Dec. 2004, Origin: WEB, Bibliographic Code: 2004ApOpt.. 43.62851.

Real-time view interpolation system for a super multiview 3D display; processing; Smithsonian/NASA ADS Physics Abstract Service; find Similar Abstracts (with default settings below); Table of Contents; Also-Read Articles (Reads History); Translate Abstract; Title: Real-Time view interpolation system for a super multiview 3D display: processing implementation and evaluation; Authors: Hamaguchi, Tadahiko; Fujii, Toshiaki; Honda, Toshio; Affiliation: AA(Telecommunications Advancement Organization of Japan) AB (Telecommunications Advancement Organization of Japan and Nagoya Univ.) AC (Telecommunications Advancement Organization of Japan and Chiba Univ.); Publication: Proc. SPIE vol. 4660, p. 105-115, Steroscopic Displays and Virtual Reality Systems IX, Andrew J. Woods; John O. Merritt; Stephen A. Benton; Mark T. Bolas; Eds. (SPIE Homepage); Publication Date: May 2002; Origin: SPIE; Abstract Copyright: (c) 2002 SPIE—The Internantion Society for Optical Engineering, Downloading of the abstract is permitted for personal use only.; Bibliographic Code: 2002SPIE.4660..105H.

3D displays; Using cellphane to convert a liquid crystal display screen into a three dimensional display (3D laptop computer and 3D Camera phone). Keigo Iizuka; Department of Electrical & Computer Engineering, 35 St. George Street, University of Toronto, Toronto, Ontario, Canada M5S IA4.

* cited by examiner

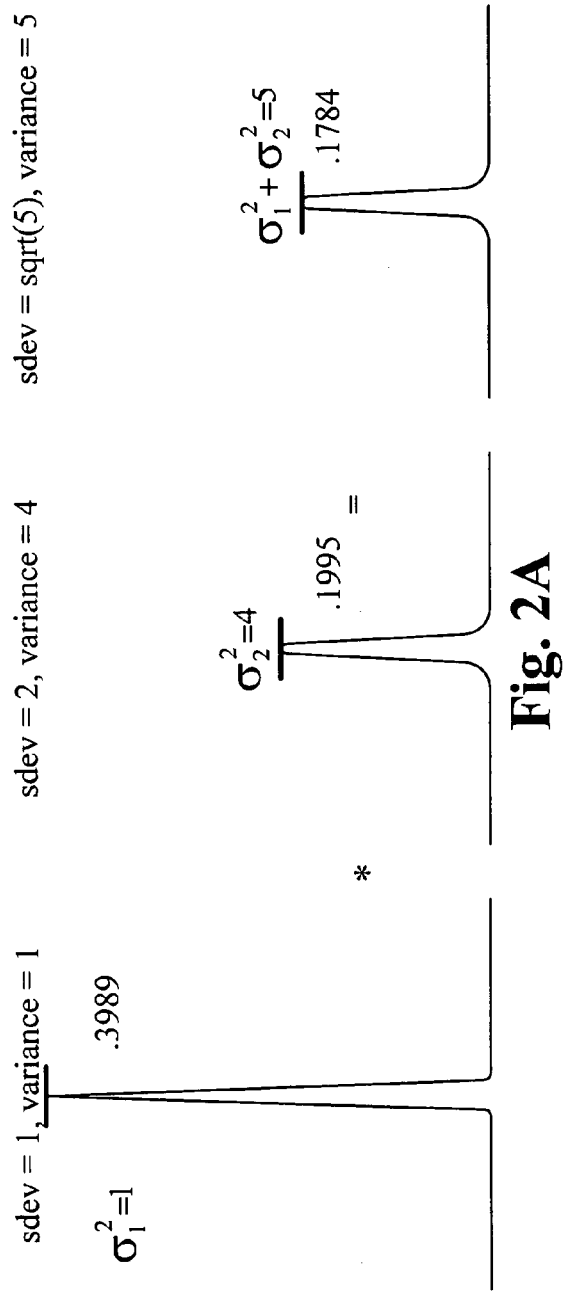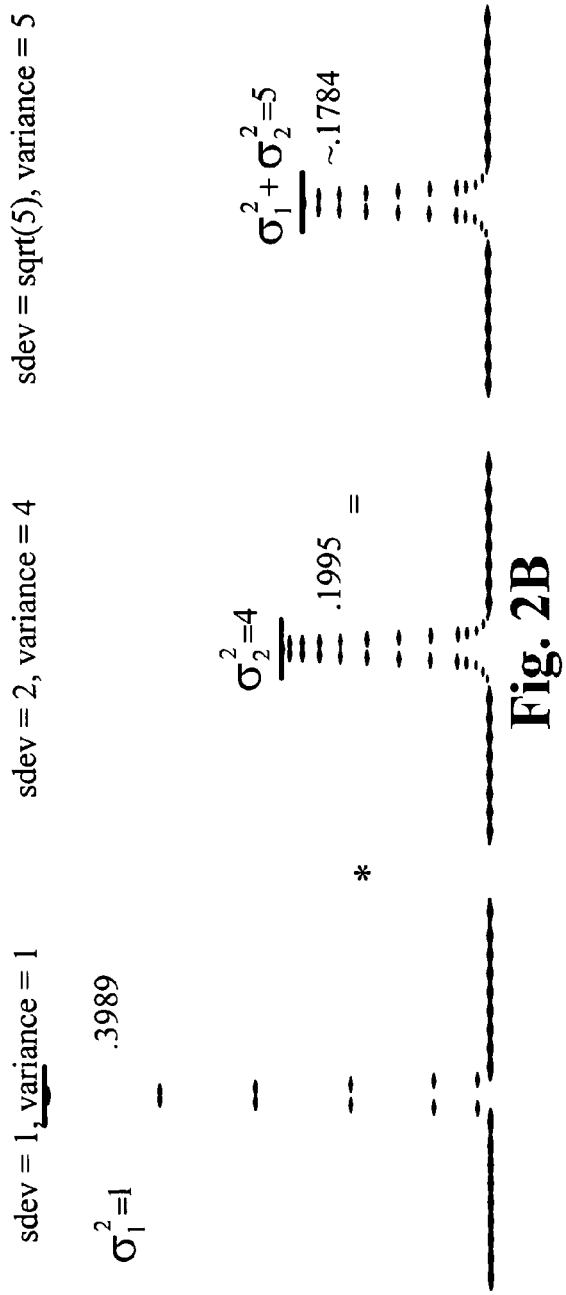

sdev = 1, variance = 1    sdev = 2, variance = 4    sdev = sqrt(5), variance = 5

$\sigma_1^2 = 1$    $\dfrac{\sigma_2^2 = 4}{}$    $\dfrac{\sigma_1^2 + \sigma_2^2 = 5}{}$

METHOD OF AND APPARATUS FOR GENERATING A DEPTH MAP UTILIZED IN AUTOFOCUSING

FIELD OF THE INVENTION

The present invention relates to the field of imaging. More specifically, the present invention relates to improved autofocusing.

BACKGROUND OF THE INVENTION

A variety of techniques for generating depth maps and autofocusing on objects have been implemented in the past. One method conventionally used in autofocusing devices, such as video cameras, is referred to a hill-climbing method. The method performs focusing by extracting a high-frequency component from a video signal obtained by an image sensing device such as a CCD and driving a taking lens such that the mountain-like characteristic curve of this high-frequency component is a maximum. In another method of autofocusing, the detected intensity of blur width (the width of an edge portion of the object) of a video signal is extracted by a differentiation circuit.

A wide range of optical distance finding apparatus and processes are known. Such apparatus and processes may be characterized as cameras which record distance information that are often referred to as depth maps of three-dimensional spatial scenes. Some conventional two-dimensional range finding cameras record the brightness of objects illuminated by incident or reflected light. The range finding cameras record images and analyze the brightness of the two-dimensional image to determine its distance from the camera. These cameras and methods have significant drawbacks as they require controlled lighting conditions and high light intensity discrimination.

Another method involves measuring the error in focus, the focal gradient, and employs the focal gradient to estimate the depth. Such a method is disclosed in the paper entitled "A New Sense for Depth Field" by Alex P. Pentland published in the Proceedings of the International Joint Conference on Artificial Intelligence, August, 1985 and revised and republished without substantive change in July 1987 in IEEE Transactions on Pattern Analysis and Machine Intelligence, Volume PAMI-9, No. 4. Pentland discusses a method of depth-map recovery which uses a single image of a scene, containing edges that are step discontinuities in the focused image. This method requires the knowledge of the location of these edges, and this method cannot be used if there are no perfect step edges in the scene.

Other methods of determining distance are based on computing the Fourier transforms of two or more recorded images and then computing the ratio of these two Fourier transforms. Computing the two-dimensional Fourier transforms of recorded images is computationally very expensive which involves complex and costly hardware.

Other methods have been implemented by comparing multiple images to determine a depth. One method includes using an image that is in-focus and an image that is out-of-focus where the in-focus value is zero, hence the mathematics are very simple. Another method utilizes two separate images, with different focuses, where the distance between the images is the blur of the first image minus the blur of the second image. Computations are performed to determine the depth, although there are significant drawbacks with the past methods implemented in these computations.

SUMMARY OF THE INVENTION

A method of and an apparatus for determining a depth map utilizing a movable lens and an image sensor are described herein. The depth information is acquired by moving the lens a short distance and acquiring multiple images with different blur quantities. An improved method of simulating gaussian blur and an approximation equation that relates a known gaussian blur quantity to a known pillbox quantity are used in conjunction with a non-linear blur difference equation. The blur quantity difference is able to be calculated and then used to determine the depth map. Many applications are possible using the method and system described herein, such as autofocusing, surveillance, robot/computer vision, autonomous vehicle navigation, multi-dimensional imaging and data compression.

In one aspect, an apparatus for determining depth information comprises a lens for acquiring an image signal, an image sensor for receiving the image signal, wherein one or more of the lens and the image sensor are movable in relation to each other and a processing module coupled to the image sensor for determining depth information by using a first blur quantity and a second blur quantity to determine a non-linear blur difference. The lens, the image sensor and the processing module are contained within an imaging device. The imaging device is selected from the group consisting of a camera, a video camera, a camcorder, a digital camera, a cell phone and a PDA. The lens is movable and acquires the image signal at a first position and then at a second position. The processing module simulates gaussian blur. The processing module simulates gaussian blur using iterations of a convolution kernel. The processing module relates a gaussian blur quantity to a pillbox blur quantity.

In another aspect, a method of determining depth information comprises receiving a first image signal with a first blur quantity at an image sensor after the first image signal passes through a lens at a first position, receiving a second image signal with a second blur quantity at the image sensor after the second image signal passes through the lens at a second position, computing a non-linear blur difference using the first blur quantity and the second blur quantity and generating a depth map from the non-linear blur difference. The method is performed within an imaging device. The imaging device is selected from the group consisting of a camera, a video camera, a camcorder, a digital camera, a cell phone and a PDA. The method further comprises simulating gaussian blur. Simulating gaussian blur uses iterations of a convolution kernel. The method further comprises relating a gaussian blur quantity to a pillbox blur quantity.

In another aspect, a method calculating depth information comprises simulating a gaussian blur quantity using a convolution kernel, relating the gaussian blur quantity to a pillbox blur quantity, computing a non-linear blur difference and generating a depth map from the non-linear blur difference. The method is performed within an imaging device. The imaging device is selected from the group consisting of a camera, a video camera, a camcorder, a digital camera, a cell phone and a PDA. Simulating gaussian blur uses iterations of a convolution kernel.

In yet another aspect, a capture and display device comprises a lens for receiving an image signal, an image sensor for receiving the received image signal, wherein one or more of the lens and the image sensor are movable in relation to each other and a program coupled to the image sensor for determining depth information by using a first blur quantity and a second blur quantity to determine a non-linear blur difference. The lens, the image sensor and the program are contained within an imaging device. The imaging device is selected from the group consisting of a camera, a video camera, a camcorder, a digital camera, a cell phone and a PDA. The lens is movable and acquires the image signal at a first position and then at a second position. The program simulates gaussian blur. The program simulates gaussian blur using iterations of a convolution kernel. The program relates a gaussian blur quantity to a pillbox blur quantity.

In another aspect, an apparatus for determining depth information comprises a lens for receiving an image signal, an image sensor for receiving the received image signal, wherein one or more of the lens and the image sensor are movable in relation to each other and a processing module coupled to the image sensor for determining depth information by using a first blur quantity and a second blur quantity to determine a non-linear blur difference, wherein a gaussian blur is simulated. The lens, the image sensor and the processing module are contained within an imaging device. The imaging device is selected from the group consisting of a camera, a video camera, a camcorder, a digital camera, a cell phone and a PDA. The image sensor is movable and acquires the image signal at a first position and then at a second position. The processing module simulates the gaussian blur using iterations of a convolution kernel. The processing module relates the gaussian blur quantity to a pillbox blur quantity.

BRIEF DESCRIPTION OF THE DRAWINGS

FIG. 2A illustrates an example of gaussian blur in continuous time.

FIG. 2B illustrates an example of gaussian blur in discrete time.

FIG. 2C illustrates an example of gaussian blur in discrete time.

DETAILED DESCRIPTION OF THE PREFERRED EMBODIMENT

A method of and an apparatus for determining a depth map are described herein. The depth information is acquired by moving a lens a short distance and acquiring multiple pictures with different blur quantities or functions. A more accurate gaussian blur implementation, in addition to a non-linear version of the blur difference allow a better determination of the depth map. By telescoping between the two blurred functions using the gaussian blur implementation, a depth map is determined. In the ideal optical scenario, the two functions are pillbox blur functions.

Figure 1:
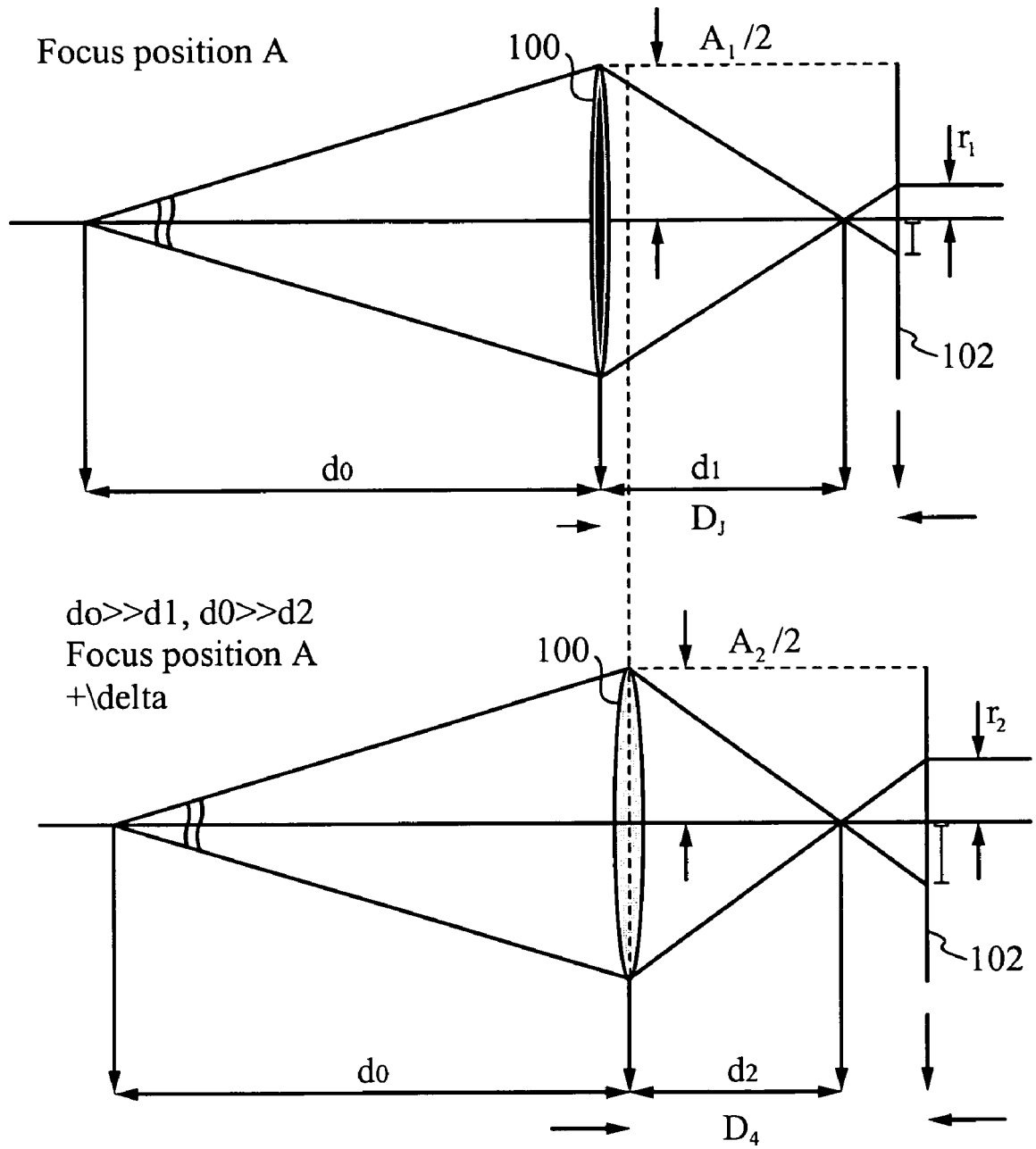
FIG. 1 illustrates an exemplary arrangement of a lens in a first position and in a second position to receive two images with different blur quantities on a sensor.

FIG. 1 illustrates an example of a lens 100 in a first position and in a second position to generate two images with different blur quantities on a sensor 102. With the lens 100 in focus position A, the distance from a scene (not shown) to the lens 100 is the distance $d_0$ and the distance between the lens and the focal point is the distance $d_1$, where the distance $d_0$ is much greater than the distance $d_1$. The distance between the lens 100 and the sensor 102 is the distance $D_f$. Furthermore, the blur radius with the lens 100 in focus position A is radius $r_1$. When the lens 100 is in focus position A+\delta, the distance from the scene (not shown) to the lens 100 is still the distance $d_0$, however the distance between the lens and the focal point is the distance $d_2$ where the distance $d_0$ is much greater than the distance $d_2$. The distance between the lens 100 and the sensor 102 is the distance $D_4$. Hence, the blur radius with the lens 100 in focus position A+\delta is the radius $r_2$. Once the different blur radii, $r_1$ and $r_2$, are known, depths of objects in the scene are able to be determined for use in a number of applications.

FIGS. 2A-C illustrate examples of gaussian blurs. In FIG. 2A, a well known result is shown in continuous time where $\sigma_1=1$ and $\sigma_1^2=1$; $\sigma_2=2$ and $\sigma_2^2=4$; $\sigma_1+\sigma_2=\sqrt{5}$ and $\sigma_1^2+\sigma_2^2=5$. Each section of equation (1), shown below, is shown in graph form in FIG. 2A. The section with $\sigma_1^2$ reaches a maximum of 0.3989, the section with $\sigma_2^2$ reaches 0.1995 and the section with $\sigma_1^2+\sigma_2^2$ reaches 0.1784.

$$\frac{1}{\sqrt{2\pi\sigma_1^2}}e^{-\left(\frac{x^2}{2\sigma_1^2}\right)} * \frac{1}{\sqrt{2\pi\sigma_2^2}}e^{-\left(\frac{x^2}{2\sigma_2^2}\right)} = \frac{1}{\sqrt{2\pi(\sigma_1^2+\sigma_2^2)}}e^{-\left(\frac{x^2}{2(\sigma_1^2+\sigma_2^2)}\right)} \quad (1)$$

FIG. 2B shows the gaussian blur calculated in discrete time using sampled data. The result is similar to that in FIG. 2A.

$$\frac{1}{\sqrt{2\pi\sigma_1^2}}e^{-\left(\frac{x_l^2}{2\sigma_1^2}\right)} * \frac{1}{\sqrt{2\pi\sigma_2^2}}e^{-\left(\frac{x_l^2}{2\sigma_2^2}\right)} = \frac{1}{\sqrt{2\pi(\sigma_1^2+\sigma_2^2)}}e^{-\left(\frac{x_l^2}{2(\sigma_1^2+\sigma_2^2)}\right)} \quad (2)$$

FIG. 2C is also in discrete time using sampled data. However, the result is not same as in FIGS. 2A and 2B. The section of equation (3) with $\sigma_1^2+\sigma_2^2$ does not reach 0.1784. Hence, there are issues with accuracy using this method.

$$\frac{1}{\sqrt{2\pi\sigma_1^2}}e^{-\left(\frac{x_k^2}{2\sigma_1^2}\right)} * \frac{1}{\sqrt{2\pi\sigma_1^2}}e^{-\left(\frac{x_k^2}{2\sigma_2^2}\right)} = \frac{1}{\sqrt{2\pi(\sigma_1^2+\sigma_2^2)}}e^{-\left(\frac{x_k^2}{2(\sigma_1^2+\sigma_2^2)}\right)} \quad (3)$$

The accuracy of determining the gaussian blur is able to be improved by using the following method based on differential equations.

In one dimension:

f: R→R

L: R×R₊→R $L(x;0)=f(x)$ g: R×R₊\{0}→R where f is the one dimensional signal and L is defined by $L(x;0)=f(x)$ and convolution with g, the gaussian blur kernel. Then:

$$L(x;t) = \int_{-\infty}^{+\infty} \frac{1}{\sqrt{2\pi t}} e^{\frac{\xi^2}{2t}} f(x-\xi)d\xi, t > 0 \qquad (4)$$

and is defined by the diffusion equation:

$$\frac{\partial L}{\partial t} = \frac{1}{2}\frac{\partial^2 L}{\partial x^2}, L(x;0) = f(x) \qquad (5)$$

Using Euler's method, the continuous equation:

$$\frac{\partial L}{\partial t} = \frac{1}{2}\frac{\partial^2 L}{\partial x^2} \qquad (6)$$

can be discretized and rewritten in the following form:

$$L_{i,k+1} = \frac{\Delta t}{2}L_{i+1,k} + (1-\Delta t)L_{i,k} + \frac{\Delta t}{2}L_{i-1,k}, \Delta t \leq \frac{1}{2} \qquad (7)$$

For example, if $\Delta t = \frac{1}{2}$, it is easy to realize the implementation above using the following convolution kernel:

[¼ ½ ¼]

Although the example where $\Delta t = \frac{1}{2}$ is used above and below for clarity, it should be understood that values for $\Delta t$ less than ½ such as ¼ are able to be used as well in one dimension. For instance, if $\Delta t = \frac{1}{4}$, then the kernel obtained is [⅛ ¾ ⅛]. By reducing the $\Delta t$ value from ½ to ¼, the number of iterations needed to have the same effect increases. The equations below utilize the assumption that $\Delta t = \frac{1}{2}$ for one dimension. The Central Limit Theorem shows that the repeated iteration of the kernel quickly yields a gaussian function:

[¼ ½ ¼]*[¼ ½ ¼]* . . . *[¼ ½ ¼]

Equation (8) is the old, less accurate version of determining the blur.

$$\frac{1}{\sqrt{2\pi\sigma_{start}^2}}e^{-\left(\frac{x_m^2}{2\sigma_{start}^2}\right)} * \frac{1}{\sqrt{2\pi\sigma_?^2}}e^{-\left(\frac{x_m^2}{2\sigma_?^2}\right)} = \frac{1}{\sqrt{2\pi\sigma_{finish}^2}}e^{-\left(\frac{x_m^2}{2\sigma_{finish}^2}\right)} \qquad (8)$$

Equation (9) is an improved version. Using the number of iterations of [¼ ½ ¼] needed to be applied to telescope between $\sigma_{start}^2$ and $\sigma_{finish}^2$, the $\sigma_?^2$ is able to be calculated accurately.

$$\frac{1}{\sqrt{2\pi\sigma_{start}^2}}e^{-\left(\frac{x_m^2}{2\sigma_{start}^2}\right)} * [1/4 \quad 1/2 \quad 1/4] * \ldots * [1/4 \quad 1/2 \quad 1/4] = \qquad (9)$$

-continued $$\frac{1}{\sqrt{2\pi\sigma_{finish}^2}}e^{-\left(\frac{x_m^2}{2\sigma_{finish}^2}\right)}$$

Using a similar numerical analysis approach shown in the 1D case, we obtain the following convolution kernel for the 2D case for $\Delta t = \frac{1}{4}$. It should be understood that values for $\Delta t$ less than ¼ such as ⅛ are able to be used as well in two dimensions. By reducing the $\Delta t$ value from ¼ to ⅛, the number of iterations needed to have the same effect increases.

$$\begin{array}{ccc} \frac{1}{48} & \frac{1}{12} & \frac{1}{48} \\ \frac{1}{12} & \frac{7}{12} & \frac{1}{12} \\ \frac{1}{48} & \frac{1}{12} & \frac{1}{48} \end{array}$$

Fast implementation of the convolution kernel is possible using vector shifts, multiplication and addition.

In one dimension for example:

h=[¼ ½ ¼]

data=[a1 a2 a3 a4 a5 a6 a7 a8 a9 a10]

result=data*h, such that:

result=¼*[a2 a3 a4 a5 a6 a7 a8 a9 a10 a1]+½*[a1 a2 a3 a4 a5 a6 a7 a8 a9 a10]+¼*[a10 a1 a2 a3 a4 a5 a6 a7 a8 a9]

Furthermore, the one dimensional version is easily generalized to two dimensions. The following relationship exists for the one dimensional and two dimensional kernels:

| One Dimension | Two Dimensions |
|---|---|
| Blur Variance → Iterations Needed | Blur Variance → Iterations Needed |
| $\sigma^2 = 1 \to 2$ | $\sigma^2 = 1 \to 4$ |
| $\sigma^2 = 4 \to 8$ | $\sigma^2 = 4 \to 16$ |
| $\sigma^2 = 9 \to 18$ | $\sigma^2 = 9 \to 36$ |
| $\sigma^2 = 16 \to 32$ | $\sigma^2 = 16 \to 64$ |

Thus, a unique relationship exists for the one dimensional and two dimensional cases.

One Dimension:
 $\Delta\sigma^2=3 \to \Delta\text{iterations}=6$
 $\Delta\sigma^2=5 \to \Delta\text{iterations}=10\times2$
 $\Delta\sigma^2=7 \to \Delta\text{iterations}=14$ Two Dimensions:
 $\Delta\sigma^2=3 \to \Delta\text{iterations}=12$
 $\Delta\sigma^2=5 \to \Delta\text{iterations}=20\times4$
 $\Delta\sigma^2=7 \to \Delta\text{iterations}=28$ The above relationship is true for the "non-linear" variance quantity $\sigma_2^2 - \sigma_1^2 = \Delta\sigma^2$ where $\sigma_2^2 > \sigma_1^2$. Thus, it is possible to accurately simulate and compute the change in Gaussian blur utilizing the method described above.

Figure 3:
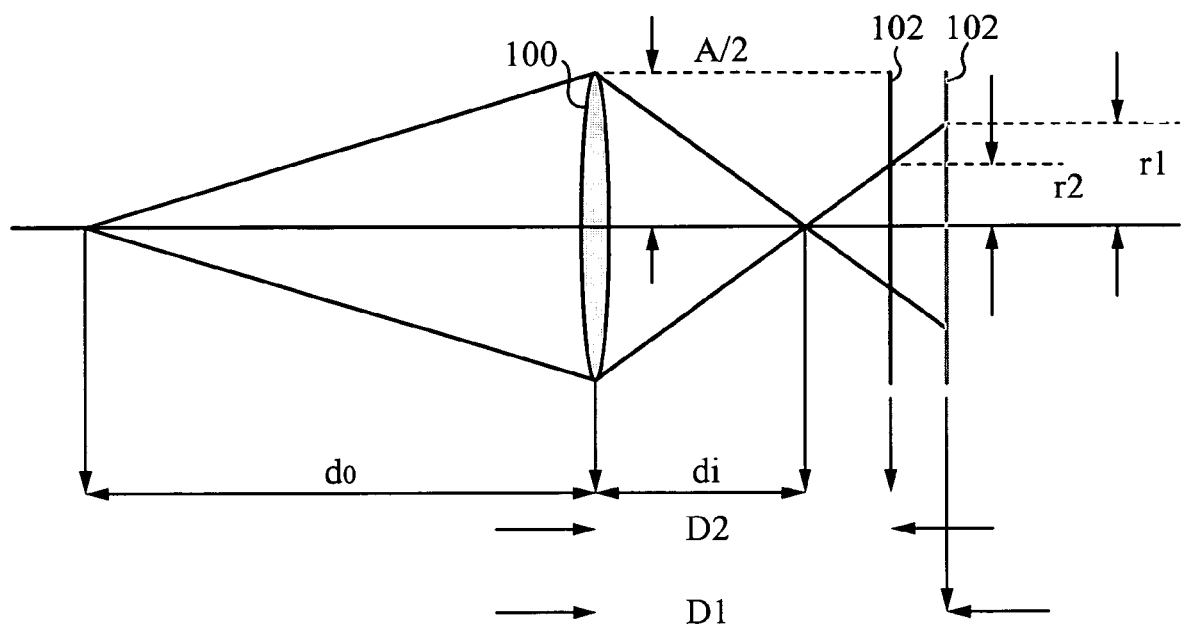
FIG. 3 illustrates an exemplary arrangement of a lens and a sensor to receive two images with different blur quantities.

From FIG. 3, equations are able to be derived to determine the blur difference. FIG. 3 shows a lens 100, with a distance of D2 between the lens 100 and the sensor 102. Since the lens 100 is movable, the distance between the lens 100 and the sensor 102 is variable such that the distances are represented by the distance D2 and the distance D1. The distance from the scene (not shown) and the lens 100 is the distance $d_0$ which is much larger than the distance between the lens 100 and the focal point designated as the distance $d_i$. Depending on the distance of the lens 100 from the sensor 102, the blur radius varies. In FIG. 3, the lens 100 moves a short distance and two radii are determined and designated as the radius $r_1$ and the radius $r_2$. The value f is designated the focal length.

$$r_1 = \frac{d_0 D_1 - d_0 f_l - f_l D_1}{2 d_0 f_{num}} \quad (10)$$

$$= > (r_1)^2$$

$$= \left( \frac{d_0 D_1 - d_0 f_l - f_l D_1}{2 d_0 f_{num}} \right)^2$$

$$r_2 = \frac{d_0 D_2 - d_0 f_l - f_l D_2}{2 d_0 f_{num}} \quad (11)$$

$$= > (r_2)^2$$

$$= \left( \frac{d_0 D_2 - d_0 f_l - f_l D_2}{2 d_0 f_{num}} \right)^2$$

Assuming r1 is larger than r2, the following positive valued quantity is able to be computed:

$$(r_1)^2 - (r_2)^2 = \frac{(d_0 D_1 - d_0 f_l - f_l D_1)^2 - (d_0 D_2 - d_0 f_l - f_l D_2)^2}{2 d_0 f_{num}} \quad (12)$$

Equation (12) is a non-linear version of the blur difference. Re-arranging equation (12) results in the following equation:

$$[-(-(r_1)^2 + (r_2)^2)(2 f_{num})^2 + (D_2 - f_l)^2 - (D_1 - f_l)^2] d_0^2 + [ \quad (13)$$
$$2 f_l \{ (D_2 - f_l) D_2 - (D_1 - f_l) D_1 \}] d_0 - [(f_l D_1)^2 - (f_l D_2)^2] = 0$$

Then, using the quadratic formula, the depth $d_0$ is able to be determined:

$$ax^2 + bx + c = 0$$

$$a = [-(-(r_1)^2 + (r_2)^2)(2 f_{num})^2 + (D_2 - f_l)^2 - (D_1 - f_l)^2] \quad (14)$$

$$b = [2 f_l \{ (D_2 - f_l) D_2 - (D_1 - f_l) D_1 \}]$$

$$c = [(f_l D_1)^2 - (f_l D_2)^2]$$

Figure 4:
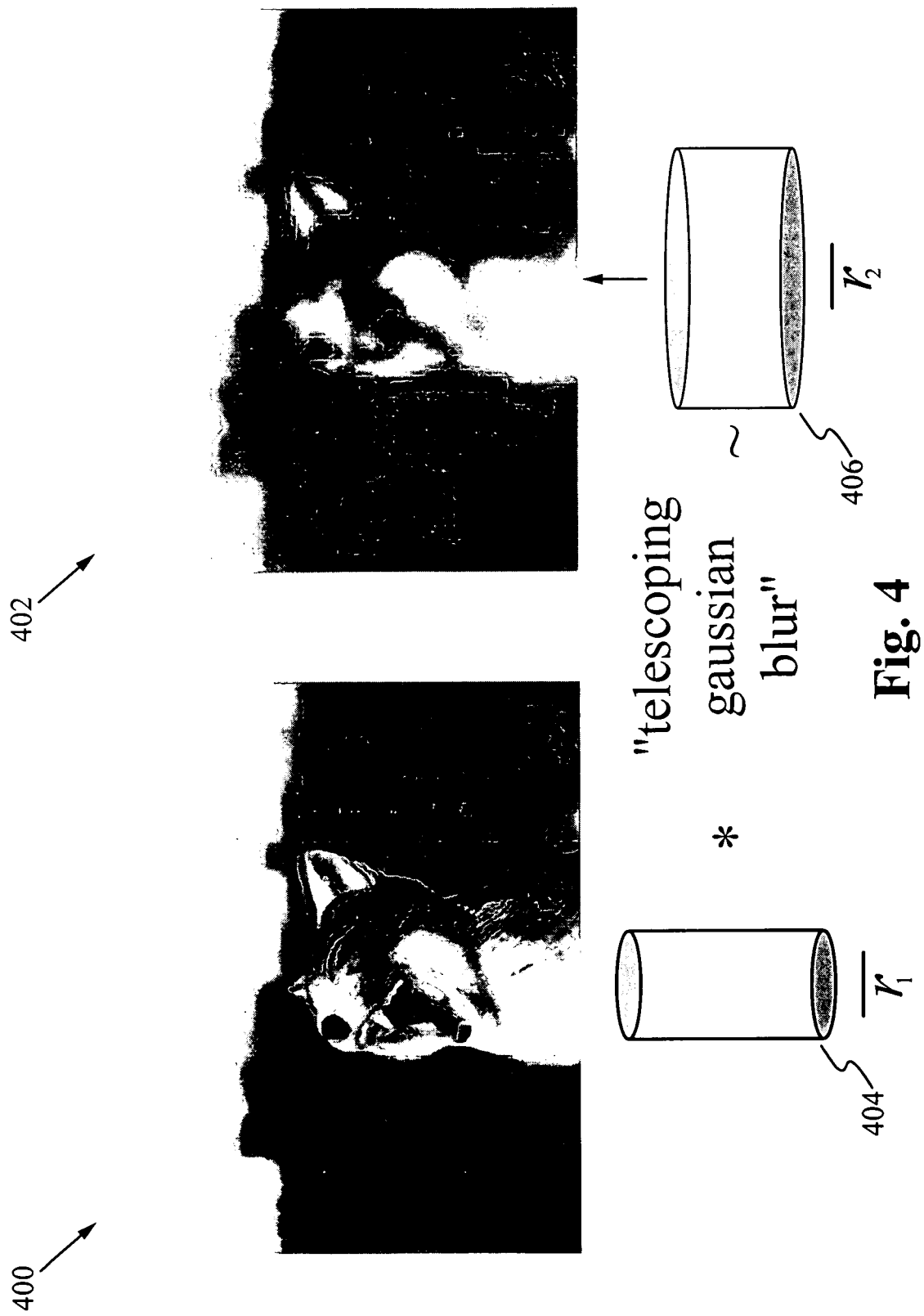
FIG. 4 illustrates two images with different blur quantities.

FIG. 4 illustrates two images with different blur quantities. A first image 400 has a narrower blur quantity 404 than a second image 402 having a wider blur quantity 406. Using a telescoping gaussian blur, the blur quantity 404 of the first image 400 is related to the blur quantity 406 of the second image 402. In the ideal optical scenario, the two blur quantities or functions are pillbox blur functions.

Figure 5:
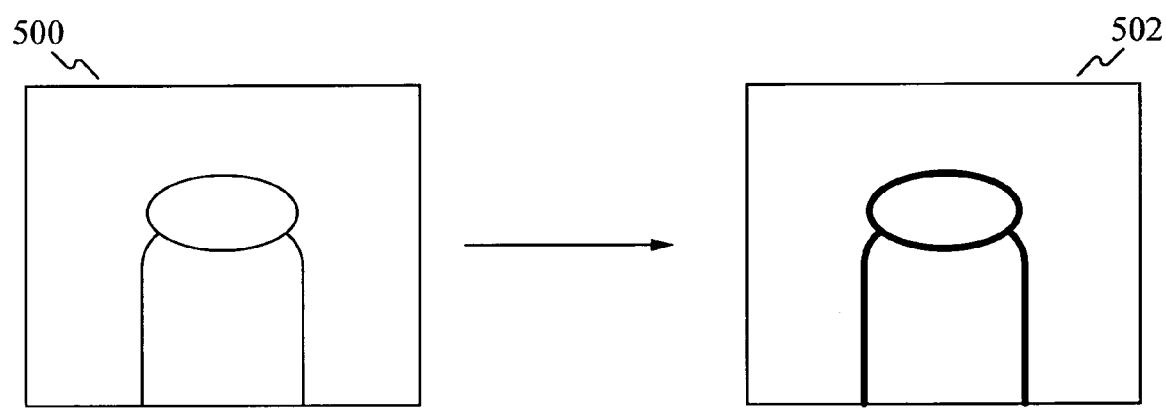
FIG. 5 illustrates two images with different blur quantities.

FIG. 5 illustrates a first image 500 with a blur radius $\bar{r}_1$ and a second image 502 with a blur radius $\bar{r}_2$. A number of equations are implemented utilizing the difference in blur of the two images. Based on the first image 500:

$$\bar{r}_1 \leftarrow \bar{r}_1 \approx \overline{2\sigma_1}$$
$$\downarrow$$
$$\overline{(r_1^2)}$$

From the second image 502:

$$\bar{r}_2 \leftarrow \bar{r}_2 \approx \overline{2\sigma_2} \quad (15)$$
$$\downarrow$$
$$\overline{(r_2^2)}$$

Then, $$\Delta \overline{(r^2)} = \overline{(r_2^2)} - \overline{(r_1^2)}$$

$$\Delta Iterations = 4 \Delta \overline{(\sigma^2)} = 4 \left( \overline{(\sigma_2^2)} - \overline{(\sigma_1^2)} \right) \approx \Delta \overline{(r^2)} = \overline{(r_2^2)} - \overline{(r_1^2)} \quad (16)$$

The overbar denotes quantities in pixel based/pixel reference units.

Figure 6:
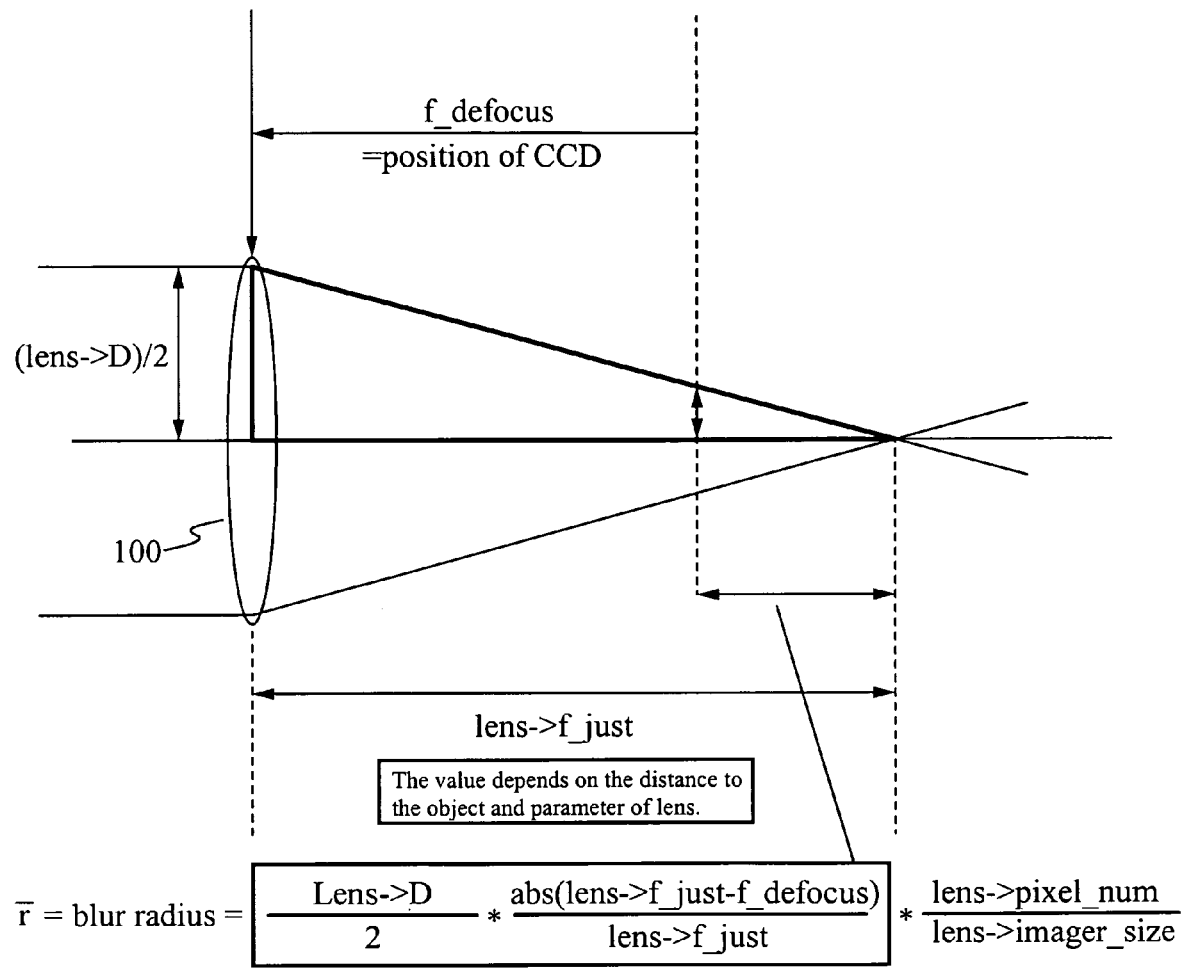
FIG. 6 illustrates a lens with designated lengths used for determining the blur quantity.

FIG. 6 illustrates a lens with designated parameters. Equation (17) is derived from FIG. 6 where changing the distance of the lens to the object and to the sensor affect the parameters used to compute the blur difference.

$$\bar{r} = \frac{\text{lens} -> D}{2} * \frac{\text{abs}(\text{lens} -> f\_just - f\_defocus)}{\text{lens} -> f\_just} * \quad (17)$$

$$\frac{\text{lens} -> \text{pixel\_num}}{\text{lens} -> \text{imager\_size}}$$

$$LPN = \text{Lens} -> \text{pixel\_num}$$
$$LIS = \text{Lens} -> \text{imager\_size}$$

$$\left( \frac{LPN}{LIS} \right)^{-2} 4 \Delta \overline{(\sigma^2)} = \left( \frac{LPN}{LIS} \right)^{-2} 4 \left( \overline{(\sigma_2^2)} - \overline{(\sigma_1^2)} \right) \quad (18)$$

$$\approx \left( \frac{LPN}{LIS} \right)^{-2} \Delta \overline{(r^2)}$$

$$= \left( \frac{LPN}{LIS} \right)^{-2} \left( \overline{(r_2^2)} - \overline{(r_1^2)} \right)$$

$$= (r_2^2) - (r_1^2)$$

$$= \Delta (r^2)$$

Therefore, using equation (18) the blur difference $\Delta(r^2)$ is able to be determined.

Hence, a first image with a first blur quantity and a second image with a second blur quantity are able to be used to determine a variance delta $\Delta(\sigma^2)$ after a number of iterations. From the variance delta, a blur difference $\Delta(r^2)$ is determined from equation 18. Using the quadratic formula and the blur radius delta, a depth $d_0$ is able to be determined, as shown below.

$$\Delta(r^2) \rightarrow \frac{-b \pm \sqrt{b^2 - 4ac}}{2a} \rightarrow d_0 \quad (19)$$

By determining the depth $d_0$, a device is able to utilize the depth information for applications such as autofocusing.

The pillbox (r) and gaussian ($\sigma$) blur kernels have the following approximate relationship with respect to filtered energy: r~2$\sigma$.

Therefore, taking a first image with pillbox blur equal to the value $r_1$ and convolving it with the approximate telescoping solution of [3×3 kernel] for 1 to n iterations yields a pillbox blur equal to the value $r_2$.

Through observations, better performance occurs when the difference in blur in the first image to the second image is small. Furthermore, it is helpful for the blur quantities to be small.

Figure 7:
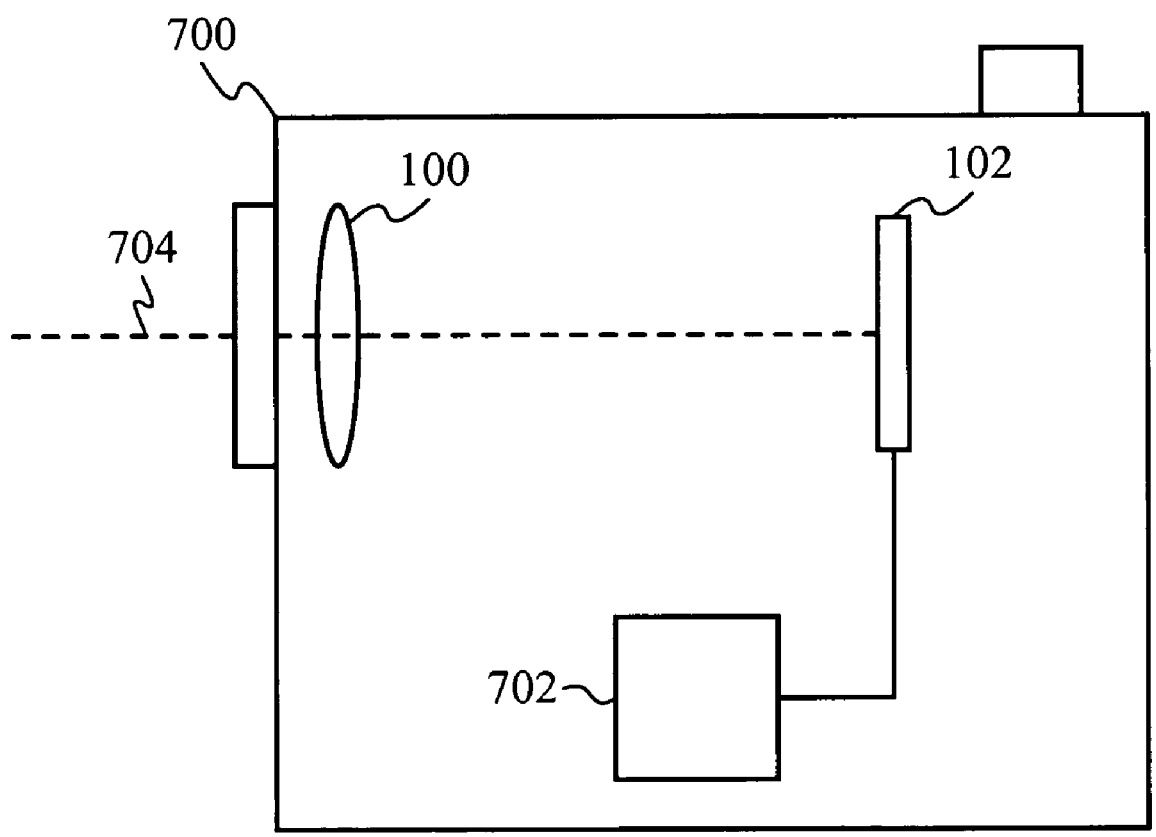
FIG. 7 illustrates a graphical representation of an imaging device.

FIG. 7 illustrates a graphical representation of an imaging device implementing the method described herein. The imaging device 700 is utilized to capture an image from a scene (not shown) as would any typical imaging device. One or more input signals 704 are acquired from the scene (not shown) and pass through the movable lens 100. The one or more signals 704 are then received at the image sensor 102 which is coupled to a computing module 702 including, but not limited to, a processor and data storage. Within the computing module 702 are one or more programs for performing the methods described herein. The imaging device 700 includes, but is not limited to cameras, video cameras, camcorders, digital cameras, cell phones, and PDAs.

There are a number of devices that are able to utilize the method of receiving multiple blurred images to generate a depth map. Such a device obtains a signal of an image from a scene. The signal passes through a lens and is received by an image sensor. The lens is then moved a short distance and the signal passes through again and is received by the image sensor. With different distances between the lens and the sensor, the signals of the images arrive at the sensors with differing blur quantities. An improved method of simulating gaussian blur and an approximation equation that relates a known gaussian blur quantity to a known pillbox quantity are used in conjunction with a non-linear blur difference equation. The blur quantity difference is able to be calculated and then used to determine the depth map. With the depth information, tasks like image segmentation and object detection are better performed. Many applications are possible with the method and system described herein, including, but not limited to autofocusing, surveillance, robot/computer vision, autonomous vehicle navigation, multi-dimensional imaging and data compression. For a user of the device which implements the method described herein, the functionality is similar to that of other related technologies. For example, a person who is taking a picture with a camera which implements the method to receive multiple blurred images, uses the camera as a generic autofocusing camera. The camera generates a depth map, and then automatically focuses the lens until it establishes the proper focus for the picture, so that the user is able to take a clear picture. However, as described above, the method and system described herein have significant advantages over other autofocusing devices.

In operation, the method and system for receiving multiple blurred images to determine a depth map improve a device's ability to perform a number of functions such as autofocusing. As described above, when a user is utilizing a device which implements the method and system described herein, the device functions as a typical device would from the user's perspective. The improvements of being able to compute a depth map using multiple blurred images received at a sensor by moving a lens a short distance enable more accurate and improved autofocusing. An improved method of simulating gaussian blur assists in determining the depth for autofocusing. Using non-linear blur difference instead of linear provides better accuracy as well. The approximate depth map is generated by implementing a pillbox blur based imaging system using an algorithm based on a gaussian blur approximation.

In other embodiments, the image sensor is moved in addition to or instead of the lens to acquire pictures with different blur quantities.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. An apparatus for determining depth information comprising:
   a. a lens for acquiring an image signal;
   b. an image sensor for receiving the image signal, wherein one or more of the lens and the image sensor are movable in relation to each other; and
   c. a processing module coupled to the image sensor for determining depth information by using a first blur quantity and a second blur quantity to determine a non-linear blur difference.

2. The apparatus as claimed in claim 1 wherein the lens, the image sensor and the processing module are contained within an imaging device.

3. The apparatus as claimed in claim 2 wherein the imaging device is selected from the group consisting of a camera, a video camera, a camcorder, a digital camera, a cell phone and a PDA.

4. The apparatus as claimed in claim 1 wherein the lens is movable and acquires the image signal at a first position and then at a second position.

5. The apparatus as claimed in claim 1 wherein the processing module simulates gaussian blur.

6. The apparatus as claimed in claim 5 wherein the processing module simulates gaussian blur using iterations of a convolution kernel.

7. The apparatus as claimed in claim 1 wherein the processing module relates a gaussian blur quantity to a pillbox blur quantity.

8. A method of determining depth information comprising:
   a. receiving a first image signal with a first blur quantity at an image sensor after the first image signal passes through a lens at a first position;
   b. receiving a second image signal with a second blur quantity at the image sensor after the second image signal passes through the lens at a second position;
   c. computing a non-linear blur difference using the first blur quantity and the second blur quantity; and
   d. generating a depth map from the non-linear blur difference.

9. The method as claimed in claim 8 wherein the method is performed within an imaging device.

10. The method as claimed in claim 9 wherein the imaging device is selected from the group consisting of a camera, a video camera, a camcorder, a digital camera, a cell phone and a PDA.

11. The method as claimed in claim 8 further comprising simulating gaussian blur.

12. The method as claimed in claim 11 wherein simulating gaussian blur uses iterations of a convolution kernel.

13. The method as claimed in claim 8 further comprising relating a gaussian blur quantity to a pillbox blur quantity.

14. A method calculating depth information comprising:
   a. simulating a gaussian blur quantity using a convolution kernel;
   b. relating the gaussian blur quantity to a pillbox blur quantity;
   c. computing a non-linear blur difference; and
   d. generating a depth map from the non-linear blur difference.

15. The method as claimed in claim 14 wherein the method is performed within an imaging device.

16. The method as claimed in claim 15 wherein the imaging device is selected from the group consisting of a camera, a video camera, a camcorder, a digital camera, a cell phone and a PDA.

17. The method as claimed in claim 14 wherein simulating gaussian blur uses iterations of a convolution kernel.

18. A capture and display device comprising:
   a. a lens for receiving an image signal;
   b. an image sensor for receiving the received image signal, wherein one or more of the lens and the image sensor are movable in relation to each other; and
   c. a program coupled to the image sensor for determining depth information by using a first blur quantity and a second blur quantity to determine a non-linear blur difference.

19. The capture and display device as claimed in claim 18 wherein the lens, the image sensor and the program are contained within an imaging device.

20. The capture and display device as claimed in claim 19 wherein the imaging device is selected from the group consisting of a camera, a video camera, a camcorder, a digital camera, a cell phone and a PDA.

21. The capture and display device as claimed in claim 18 wherein the lens is movable and acquires the image signal at a first position and then at a second position.

22. The capture and display device as claimed in claim 18 wherein the program simulates gaussian blur.

23. The capture and display device as claimed in claim 22 wherein the program simulates gaussian blur using iterations of a convolution kernel.

24. The capture and display device as claimed in claim 18 wherein the program relates a gaussian blur quantity to a pillbox blur quantity.

25. An apparatus for determining depth information comprising:
   a. a lens for receiving an image signal;
   b. an image sensor for receiving the received image signal, wherein one or more of the lens and the image sensor are movable in relation to each other; and
   c. a processing module coupled to the image sensor for determining depth information by using a first blur quantity and a second blur quantity to determine a non-linear blur difference, wherein a gaussian blur is simulated.

26. The apparatus as claimed in claim 25 wherein the lens, the image sensor and the processing module are contained within an imaging device.

27. The apparatus as claimed in claim 26 wherein the imaging device is selected from the group consisting of a camera, a video camera, a camcorder, a digital camera, a cell phone and a PDA.

28. The apparatus as claimed in claim 25 wherein the image sensor is movable and acquires the image signal at a first position and then at a second position.

29. The apparatus as claimed in claim 25 wherein the processing module simulates the gaussian blur using iterations of a convolution kernel.

30. The apparatus as claimed in claim 25 wherein the processing module relates the gaussian blur quantity to a pillbox blur quantity.

* * * * *